US012337601B2

(12) United States Patent
Araki et al.

(10) Patent No.: US 12,337,601 B2
(45) Date of Patent: Jun. 24, 2025

(54) LIQUID DISCHARGE HEAD, LIQUID DISCHARGE DEVICE, AND LIQUID DISCHARGE APPARATUS

(71) Applicants: Satomi Araki, Kanagawa (JP); Takahiro Yoshida, Kanagawa (JP)

(72) Inventors: Satomi Araki, Kanagawa (JP); Takahiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 181 days.

(21) Appl. No.: 18/118,141

(22) Filed: Mar. 7, 2023

(65) Prior Publication Data

US 2023/0302798 A1 Sep. 28, 2023

(30) Foreign Application Priority Data

Mar. 23, 2022 (JP) ................................ 2022-046418

(51) Int. Cl.
*B41J 2/14* (2006.01)

(52) U.S. Cl.
CPC .................................. *B41J 2/1433* (2013.01)

(58) Field of Classification Search
CPC ...................................................... B41J 2/1433
See application file for complete search history.

(56) References Cited

U.S. PATENT DOCUMENTS

| | | | | |
|---|---|---|---|---|
| 9,199,466 | B1 * | 12/2015 | Herrmann | B41J 2/1433 |
| 2014/0218428 | A1 | 8/2014 | Araki et al. | |
| 2015/0251414 | A1 | 9/2015 | Araki | |
| 2016/0075132 | A1 | 3/2016 | Kitaoka et al. | |
| 2016/0355011 | A1 | 12/2016 | Masuda et al. | |
| 2017/0066236 | A1 | 3/2017 | Sohgawa et al. | |
| 2017/0151780 | A1 | 6/2017 | Masuda et al. | |
| 2018/0297362 | A1 * | 10/2018 | Okui | B41J 2/155 |
| 2021/0162746 | A1 | 6/2021 | Araki | |

FOREIGN PATENT DOCUMENTS

| | | |
|---|---|---|
| JP | 2006-256049 | 9/2006 |
| JP | 2013-173264 | 9/2013 |

* cited by examiner

*Primary Examiner* — Jason S Uhlenhake
(74) *Attorney, Agent, or Firm* — XSENSUS LLP

(57) ABSTRACT

A liquid discharge head includes: a nozzle plate having multiple nozzles on a plane of the nozzle plate in a first direction and a second direction orthogonal to the first direction; and a nozzle plate holder adjacent to the nozzle plate in the first direction and configured to hold the nozzle plate, wherein the multiple nozzles in the nozzle plate are arrayed in a third direction inclined with the first direction to form a nozzle array, multiple nozzle arrays, including the nozzle array, arrayed in the nozzle plate in a fourth direction inclined with respect to the second direction, and the nozzle plate has: a nozzle-plate short side inclined with respect to the second direction; and a nozzle-plate long side intersecting the nozzle-plate short side and along the fourth direction, and the nozzle-plate short side and the nozzle-plate long side form an acute angle θ1.

10 Claims, 10 Drawing Sheets

COMPARATIVE EXAMPLE

COMPARATIVE EXAMPLE

LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-046418, filed on Mar. 23, 2022, in the Japan Patent Office, the entire disclosure of which is hereby incorporated by reference herein.

BACKGROUND

Technical Field

Embodiments of this disclosure relate to a liquid discharge head, a liquid discharge device, and a liquid discharge apparatus.

Related Art

A liquid discharge head includes multiple head modules that are connected, and each of the head modules includes multiple nozzles that discharge liquid. In the liquid discharge head, a nozzle plate is formed in the shape of a parallelogram to obtain a nozzle density in a connecting portion in which the multiple head modules is connected. Consequently, a length in a direction in which the multiple head modules is arranged becomes greater, and installation space for the liquid discharge head needs to be larger.

SUMMARY

A liquid discharge head includes: a nozzle plate having multiple nozzles on a plane of the nozzle plate in a first direction and a second direction orthogonal to the first direction; and a nozzle plate holder adjacent to the nozzle plate in the first direction and configured to hold the nozzle plate, wherein the multiple nozzles in the nozzle plate are arrayed in a third direction inclined with the first direction to form a nozzle array, multiple nozzle arrays, including the nozzle array, arrayed in the nozzle plate in a fourth direction inclined with respect to the second direction, and the nozzle plate has: a nozzle-plate short side inclined with respect to the second direction; and a nozzle-plate long side intersecting the nozzle-plate short side and along the fourth direction, and the nozzle-plate short side and the nozzle-plate long side form an acute angle θ1, and the nozzle plate holder has: a holder long side along the nozzle-plate long side; and a holder short side intersecting the holder long side with an internal angle θ2 adjacent to the acute angle θ1, and a sum of the angle θ1 and the angle θ2 is less than 180 degrees.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
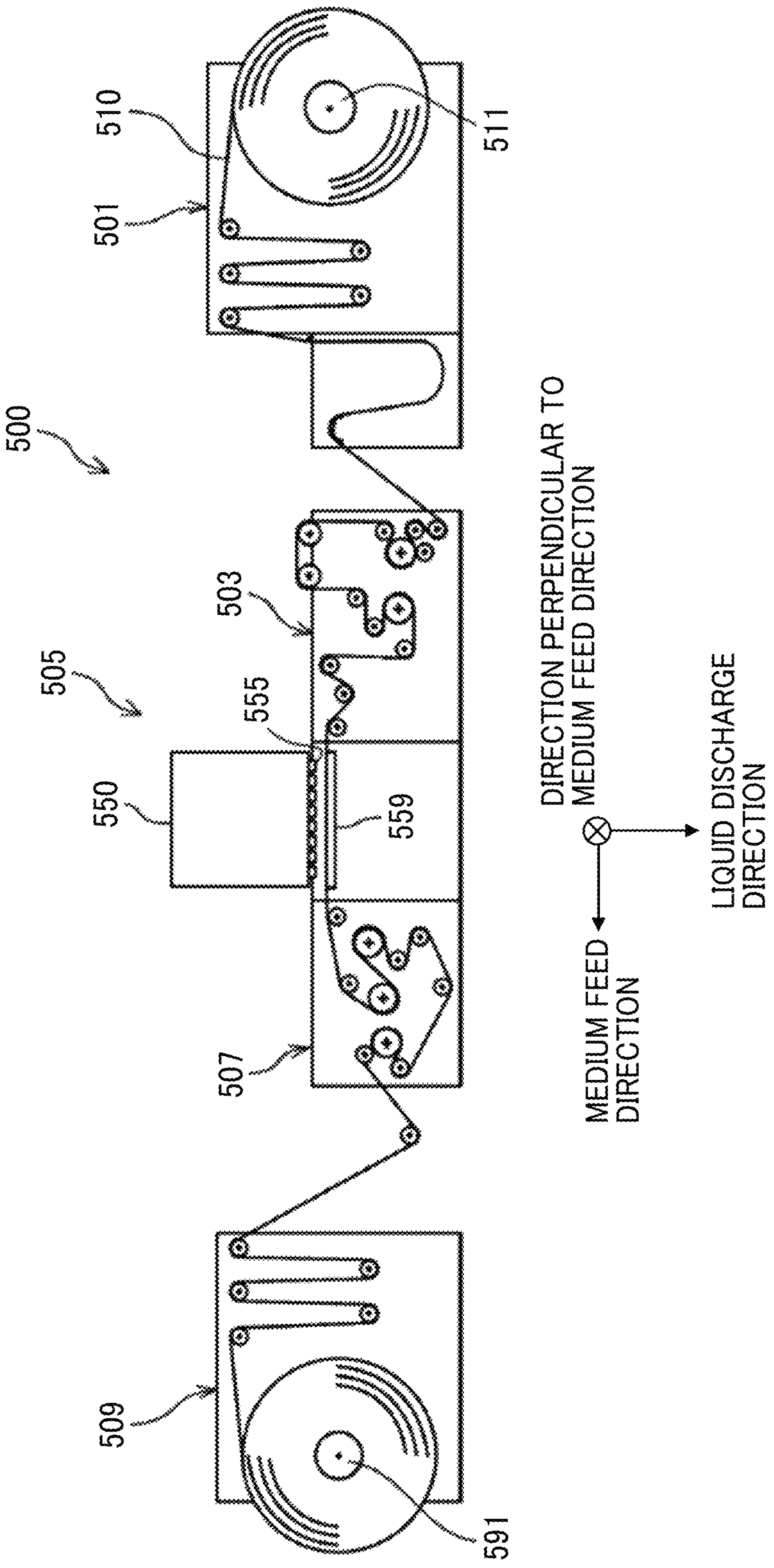
FIG. 1 is a schematic view illustrating one example of a liquid discharge apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

In the drawings for explaining the following embodiments, the same reference codes are allocated to elements having the same function or shape, and redundant descriptions thereof are omitted below.

<Brief Explanation of Liquid Discharge Apparatus>

First, a liquid discharge apparatus is briefly described with reference to FIG. 1 that is a schematic view illustrating one example of the liquid discharge apparatus. The liquid discharge apparatus illustrated in FIG. 1 is a printing apparatus 500 that discharges ink to a sheet based on an inkjet method to form an image on the sheet.

The printing apparatus 500 includes a sheet feeding unit 501, a conveyance unit 503, a printing unit 505, a drying unit 507, and a sheet ejection unit 509. The sheet feeding unit 501 includes a holding roller 511 that holds a sheet 510 wound in a roll shape. The sheet feeding unit 501 supplies the long continuous sheet 510 toward the printing unit 505. The conveyance unit 503 performs, for example, tension control or skew correction on the sheet 510 supplied from the sheet feeding unit 501 to adjust tension or a conveyance position of the sheet 510, and then conveys the sheet 510 to the printing unit 505.

The printing unit 505 includes an inkjet recording unit 550 on which a head unit 555 is mounted, and a conveyance guide member 559 disposed opposite the inkjet recording unit 550. The printing unit 505 causes ink to be discharged from the head unit 555 to the sheet 510 which moves on the conveyance guide member 559, thereby forming an image on the sheet 510.

The number of head units 555 to be mounted on the inkjet recording unit 550 can be appropriately increased or decreased depending on an ink color type or the number of ink colors to be used by the printing apparatus 500. Moreover, the liquid to be used by the head unit 555 is not limited to ink, and a treatment liquid for modifying a surface of the sheet 510 or a coating agent for protecting an image formed on the sheet 510 can be used.

The drying unit 507 heats the sheet 510 bearing an image to dry the sheet 510 and the image formed on the sheet 510. The sheet ejection unit 509 includes a winding-up roller 591 that winds-up the sheet 510, so that the sheet 510 fed from the drying unit 507 is wound around the winding-up roller 591.

Although a description is hereinafter given based on a configuration of the printing apparatus 500, a liquid discharge apparatus according to each embodiment of the present disclosure is not limited to the printing apparatus 500. For example, each embodiment of the present disclosure can be applied to a solid object shaping apparatus (a three-dimensional shaping apparatus) that causes a shaping liquid to be discharged to powder layers containing powder formed in a layer manner to form a solid object (a three-dimensional object). In addition, each embodiment of the present disclosure can be applied to an apparatus such as an electronic element producing apparatus that causes a resist pattern forming liquid to be discharged to form a resist pattern of an electronic circuit.

The sheet 510 is used as a medium. However, a medium is not limited to the sheet 510. For example, various materials such as fiber, cloth, leather, metal, plastic, glass, wood, and ceramic can be employed in addition to paper. A shape of the medium is not limited to long. A medium that is cut in a predetermined size can be employed.

The printing apparatus 500 has been described using the configuration in which the sheet 510 is moved with respect to the inkjet recording unit 550 in a home position to form an image. Such a configuration is called a line-type configuration. However, a configuration of the printing apparatus 500 is not limited to the line-type configuration. The printing apparatus 500 can have a configuration in which the inkjet recording unit 550 and the sheet 510 relatively move. Thus, for example, the printing apparatus 500 may have a serial-type configuration in which an inkjet recording unit is moved in a direction orthogonal to a sheet feed direction with respect to a sheet intermittently fed to form an image on a sheet 510. Alternatively, the printing apparatus 500 may have a flat-head-type configuration in which an inkjet recording unit is moved in an XY direction with respect to a sheet held in a sheet stacking table to form an image on a sheet 510.

Moreover, discharge matter to be used by the liquid discharge apparatus can be a solution, a suspension, or an emulsion including a solvent such as water and an organic solvent, a colorant such as a dye and a pigment, a functionality adding material such as a polymerizable compound, a resin, and a surface-active agent, a biocompatible material such as a deoxyribonucleic acid (DNA), an amino acid, a protein, and calcium, and an edible material such as a natural coloring agent. Moreover, a liquid containing fine powder such as metal powder may be used. The discharge matter and the liquid can be used for, for example, inkjet ink, coating paint, a surface treatment liquid, a liquid for forming an electronic circuit resist pattern or a component of an element such as an electronic element and a light emitting element, and a three-dimensional shaping liquid.

<Configuration of Head Unit>

Figure 2:
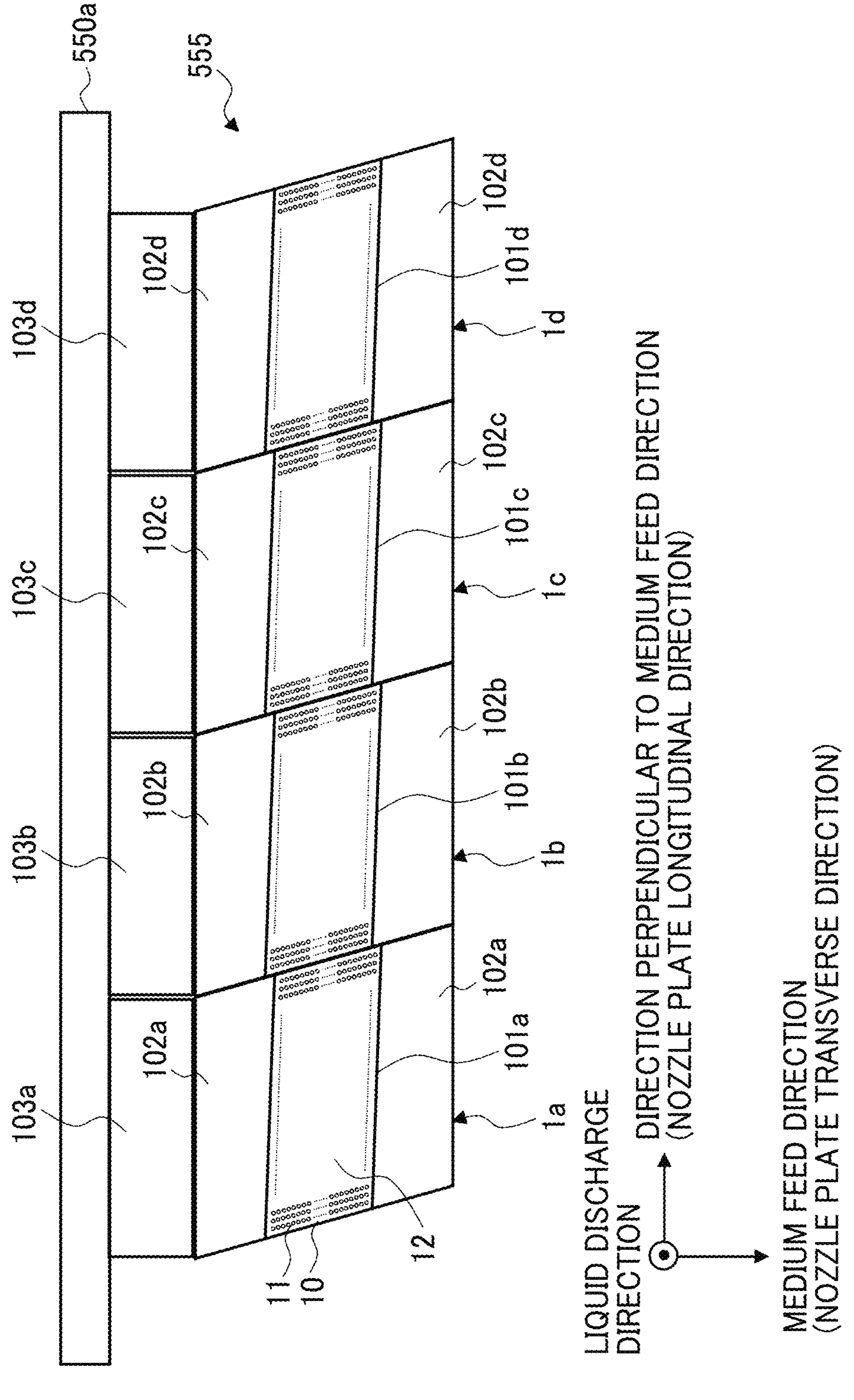
FIG. 2 is a diagram illustrating one example of a head unit.

Next, a configuration of one example of a head unit is described with reference to FIG. 2. In FIG. 2, one of the eight head units 555 in the inkjet recording unit 550 illustrated in FIG. 1 is illustrated as seen from the side of the conveyance guide member 559.

The head unit 555 includes multiple heads 1*a*, 1*b*, 1*c*, and 1*d* that are adjacently arranged in a direction orthogonal to a medium feed direction. Hereinafter, the heads 1*a* through 1*d* may be collectively called the head 1 or heads 1. The term "direction orthogonal to a medium feed direction" used in the present embodiment roughly matches "a second direction" (a direction in which multiple nozzles is equally spaced apart at a predetermined pitch corresponding to a recording resolution) described below. In addition, the term "medium feed direction" roughly matches "a first direction" (a direction orthogonal to the second direction) described below.

The heads 1*a* through 1*d* respectively include liquid dischargers 101*a* through 101*d*, nozzle plate holders 102*a* through 102*d*, and mounting members 103*a* through 103*d*. Hereinafter, the liquid dischargers 101*a* through 101*d* may be collectively called the liquid discharger 101 or liquid dischargers 101. Similarly, the nozzle plate holders 102*a* through 102*d* may be collectively called the nozzle plate holder 102 or nozzle plate holders 102, and the mounting members 103*a* through 103*d* may be collectively called the mounting member 103 or mounting members 103.

The liquid discharger 101 of the head 1 includes a nozzle plate 10 having a substantially parallelogram shape. The nozzle plate 10 has a nozzle surface 12 on which nozzles 11 that discharge liquid are formed. Although some of the nozzles 11 are omitted in FIG. 2 for the sake of simplicity, the nozzles 11 are also formed in a blank area on the nozzle surface 12 in practice. The nozzle plate 10 is held by the nozzle plate holder 102. The nozzle plate holder 102 includes the mounting member 103 disposed to one portion of the nozzle plate holder 102. The mounting member 103 is attached to a supporting member 550*a* disposed to the inkjet recording unit 550, so that the head unit 555 is secured to the inkjet recording unit 550.

<Configuration of Head>

Figure 3:
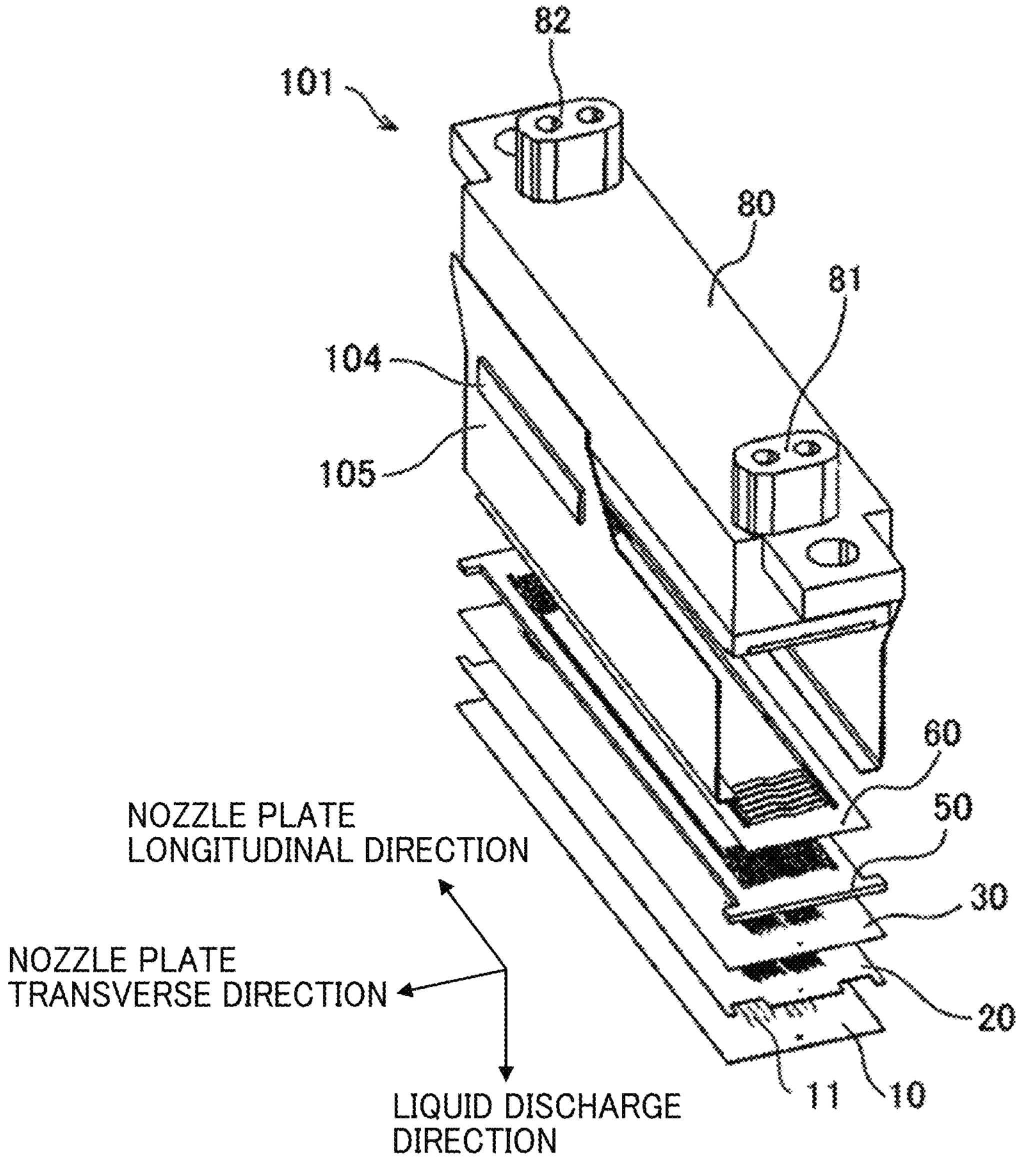
FIG. 3 is a schematic exploded view illustrating one example of a head.
Figure 4:
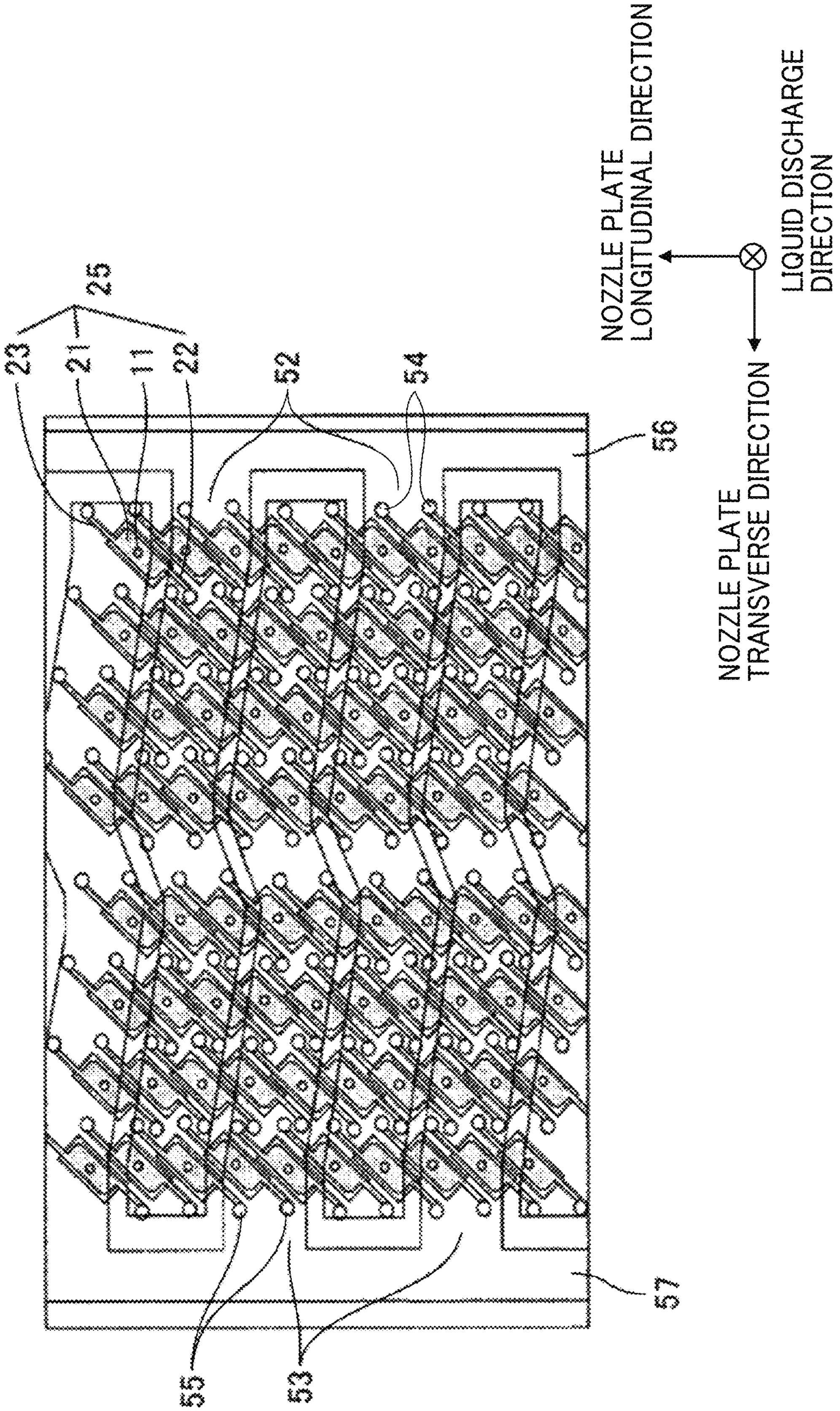
FIG. 4 is a diagram illustrating one example a channel portion of the head.
Figure 5:
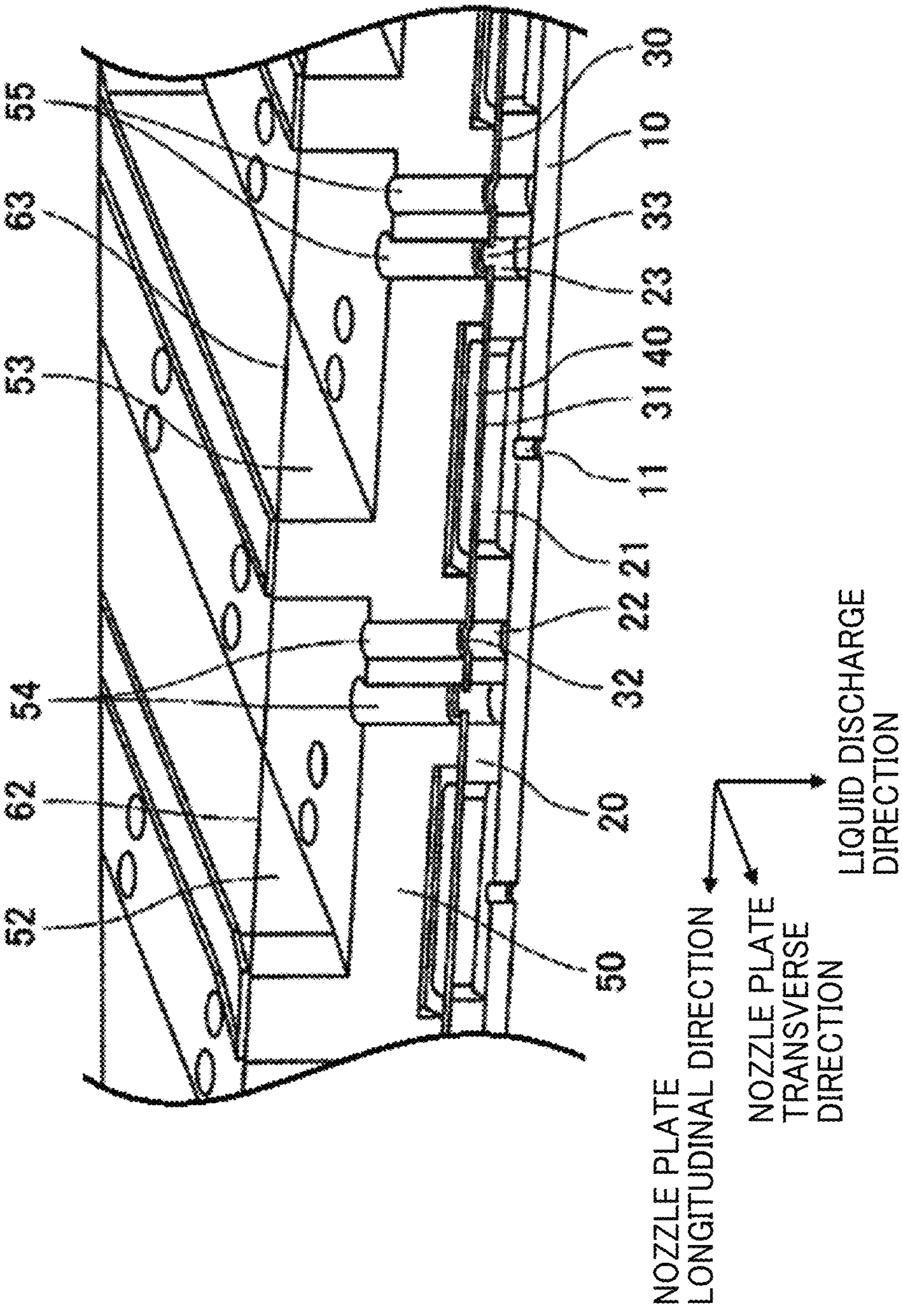
FIG. 5 is a cross-sectional view illustrating one example of the channel portion of the head.

Next, a configuration of a head is described with reference to FIGS. 3 through 5. FIG. 3 is a schematic exploded view illustrating one example of the head 1. In FIG. 3, the liquid discharger 101 of the head 1 illustrated in FIG. 2 is illustrated. FIG. 4 is a schematic view illustrating one example of a channel portion of the head 1, and FIG. 5 is a cross-sectional view illustrating one example of the channel portion of the head 1. Although the nozzle plate 10 is formed in a substantially parallelogram shape as illustrated in FIG. 2, the description herein is given using the simplified drawings in which the nozzle plate 10 is rectangular.

The liquid discharger 101 of the head 1 includes the nozzle plate 10, an individual channel plate 20 (an individual channel member), a diaphragm plate member 30, a common channel member 50, a damper member 60, a frame member 80, and a substrate (a flexible wiring board) 105 on which a drive circuit 104 is mounted.

The nozzle plate 10 includes multiple nozzles 11 which discharge liquid (ink in the present embodiment), and the multiple nozzles 11 is two-dimensionally arranged in a transverse direction of the nozzle plate 10 (a nozzle plate transverse direction) and a nozzle plate longitudinal direction orthogonal to the nozzle plate transverse direction.

The individual channel plate 20 provides multiple pressure chambers 21 (individual liquid chambers) communicating with the multiple respective nozzles 11, multiple individual supply channels 22 communicating with the multiple respective pressure chambers 21, and multiple individual collection channels 23 communicating with the multiple respective pressure chambers 21. A combination of one pressure chamber 21, the individual supply channel 22 communicating with the one pressure chamber 21, and the individual collection channel 23 communicating with the one pressure chamber 21 is referred to as an individual channel 25.

The diaphragm plate member 30 provides a diaphragm plate 31 serving as a deformable wall of the pressure chambers 21, and a piezoelectric element 40 is integrated with the diaphragm plate 31. On the diaphragm plate member 30, a supply side opening 32 communicating with the individual supply channel 22, and a collection side opening 33 communicating with the individual collection channel 23 are formed.

The piezoelectric element 40 is a pressure generator that causes the diaphragm plate 31 to be deformed to pressurize liquid inside the pressure chambers 21.

The individual channel plate 20 and the diaphragm plate member 30 are not limited to separate members. For example, the use of a silicon on insulator (SOI) substrate may enable an individual channel plate 20 and a diaphragm plate member 30 to be integrally formed of the same member. That is, a SOI substrate including a silicon oxide film, a silicon layer, and a silicon oxide film that are formed in this order on a silicon substrate may be used. In such a case, the silicon substrate can serve as an individual channel plate 20, whereas the silicon oxide film, the silicon layer, and the silicon oxide film can be formed as a diaphragm plate member 30. In this configuration, the diaphragm plate member 30 has a layer structure including the silicon oxide film, the silicon layer, and the silicon oxide film of the SIO substrate. Accordingly, the diaphragm plate member 30 can be made of a material of a film formed on a surface of the individual channel plate 20.

The common channel member 50 includes multiple common-supply branch channels 52 communicating with two or more individual supply channels 22, and multiple common-collection branch channels 53 communicating with two or more individual collection channels 23. The common-supply branch channels 52 and the common-collection branch channels 53 are alternately formed in an adjacent manner in the nozzle plate longitudinal direction. On the common channel member 50, a through hole serving as a supply port 54 and a through hole serving as a collection port 55 are formed.

The supply port 54 communicates with each of the supply side opening 32 of the individual supply channel 22 and the common-supply branch channel 52 to connect the supply side opening 32 and the common-supply branch channel 52.

The collection port 55 communicates with each of the collection side opening 33 of the individual collection channel 23 and the common-collection branch channel 53 to connect the collection side opening 33 and the common-collection branch channel 53.

In addition, the common channel member 50 includes one or multiple common-supply main channels 56 communicating with the multiple common-supply branch channels 52, and one or multiple common-collection main channels 57 communicating with the multiple common-collection branch channels 53.

The damper member 60 includes a supply side damper 62 facing (disposed opposite) the supply port 54 of the common-supply branch channel 52, and a collection side damper 63 facing (disposed opposite) the collection port 55 of the common-collection branch channel 53. Herein, the common-supply branch channels 52 and the common-collection branch channels 53 are configured by sealing grooves that are alternately arranged on the common channel member 50 of the same member with the supply side damper 62 or the collection side damper 63 of the damper member 60. As for the damper member 60, an inorganic thin film or a metal-thin film that is strong against an organic solvent is preferably used as a damper material. Each of the supply side damper 62 and the collection side damper 63 of the damper member 60 has a thickness that is preferably 10 μm or less.

The common-supply branch channel 52, the common-collection branch channel 53, the common-supply main channel 56, and the common-collection main channel 57 each include an inner wall on which a protective film (also called a wet film) for protecting the inner wall from liquid flowing through the channel is formed. For example, the inner walls of the common-supply branch channel 52 and the common-collection branch channel 53, and the inner walls of the common-supply main channel 56 and the common-collection main channel 57 have surfaces on which silicon oxide films are formed by heat treatment of silicon (Si) substrates. On the silicone oxide films, tantalum silicon oxide films that protect the surfaces of the Si substrates from ink are formed.

The frame member 80 includes a supply port 81 and a discharge port 82 that are arranged in an upper portion of the frame member 80. The supply port 81 supplies liquid to the common-supply main channel 56, and the discharge port 82 discharges liquid to be discharged by the common-collection main channel 57.

COMPARATIVE EXAMPLES

Next, comparative examples of head units are described with reference to FIGS. 6A and 6B.

Figure 6A:
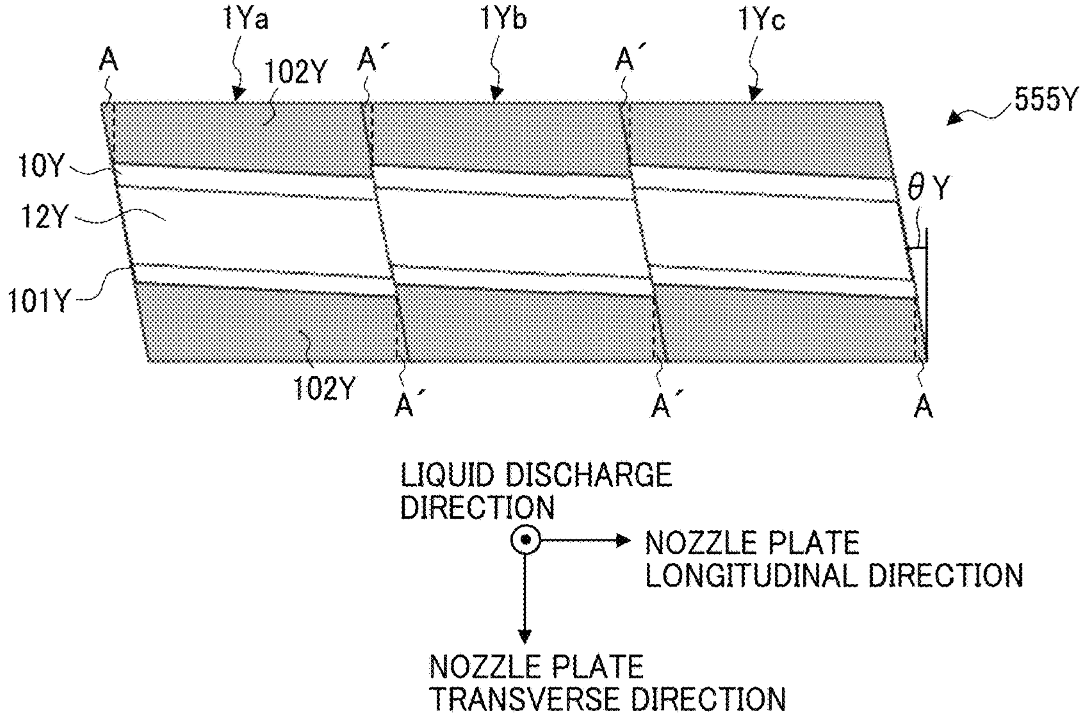
FIGS. 6A and 6B are diagrams each illustrating a comparative example of a head.
Figure 6B:
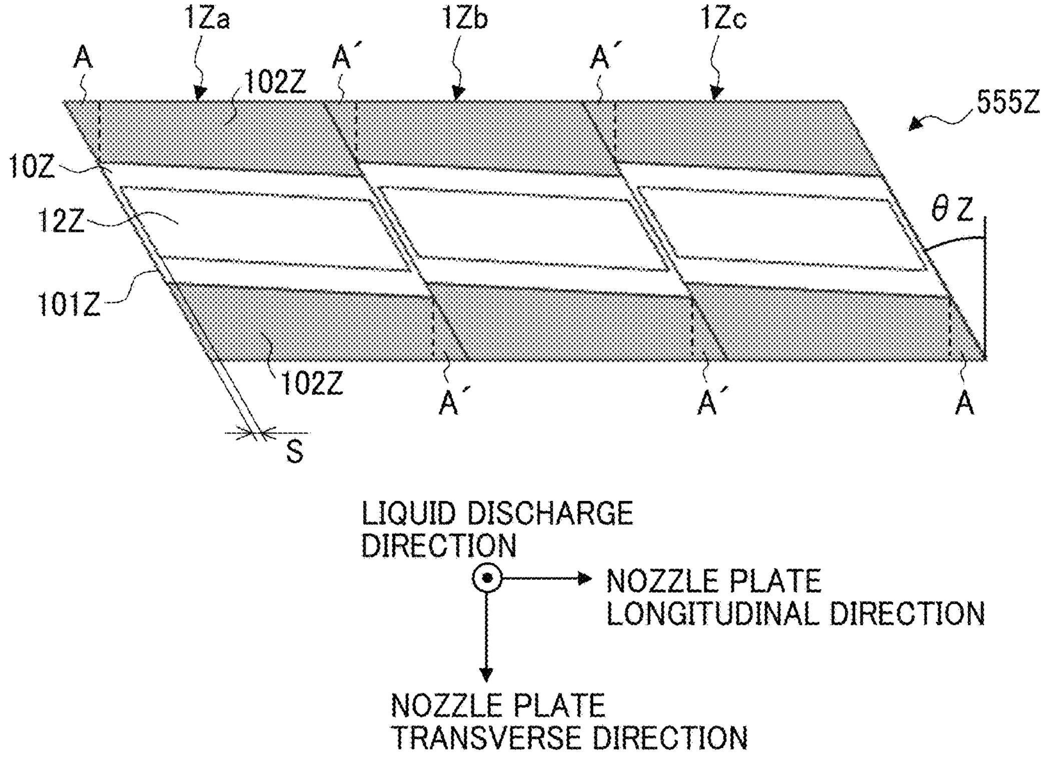

A head unit 555Y illustrated in FIG. 6A and a head unit 555Z illustrated in FIG. 6B respectively include multiple heads 1Ya through 1Yc and multiple heads 1Za through 1Zc. The heads 1Ya through 1Yc are adjacently arranged, so that the head unit 555Y is configured in an array manner. Similarly, the heads 1Za through 1Zc are adjacently arranged, so that head unit 555Z is configured in an array manner. In the head unit 555Y illustrated in FIG. 6A, each of the heads 1Ya through 1Yc has a shape (an edge line) inclined at an angle θY with respect to a nozzle plate transverse direction, and each of a liquid discharger 101Y and a nozzle plate 10Y is formed in a shape along the edge line. That is, the head 1Y includes the nozzle plate 10Y having a parallelogram shape, and multiple nozzles is regularly arranged in a two-dimensional manner as described above on a nozzle surface 12Y (a nozzle area) of the nozzle plate 10Y. Moreover, the nozzle plate 10Y is held by a nozzle plate holder 102Y. In each of FIGS. 6A and 6B, the nozzles are omitted. In the configuration of the head unit 555Y, the nozzles are arranged up to positions near edges of the nozzle surface 12Y (near both end portions in a nozzle plate longitudinal direction).

In the head unit 555Z illustrated in FIG. 6B, each of the heads 1Za through 1Zc has a shape inclined at an angle θZ that is greater than the angle θY of the head unit 555Y illustrated in FIG. 6A, and a space S is arranged in a connecting portion of each of the heads 1Za, 1Zb, and 1Zc. The arrangement of the space S enables both end portions of a nozzle surface 12Z of each of the heads 1Za through 1Zc to be positioned away from an edge of a nozzle plate 10Z. Thus, impact from an external unit does not tend to be transmitted to an element such as a nozzle, a pressure chamber, and a channel, thereby reducing damage to the head. Each of the heads 1Za through 1Zc illustrated in FIG. 6B includes a liquid discharger 101Z.

However, in a case where the nozzle plates 10Y and 10Z have parallelogram shapes as respectively illustrated in FIGS. 6A and 6B, both ends of the nozzle plate holders 102Y and 102Z extend outward. As a result, a length in a nozzle plate longitudinal direction is increased, causing an increase in a head size or a head unit size.

Herein, the nozzle plate transverse direction is one example of "a first direction," whereas the nozzle plate longitudinal direction is one example of "a second direction." The nozzle plate transverse direction does not indicate a direction of a short side of each nozzle plate 10 (10Y, 10Z) having a parallelogram shape. Assume that a nozzle plate may be rectangular. In such a case, a direction of a short side of the rectangle is defined as a nozzle plate transverse direction. Similarly, the nozzle plate longitudinal direction does not indicate a direction of a long side of the nozzle plate 10 (10Y, 10Z) having the parallelogram shape. Assume that a nozzle plate may be rectangular. In such a case, a direction of a long side of the rectangle is defined as a nozzle plate longitudinal direction.

First Embodiment

Figure 7:
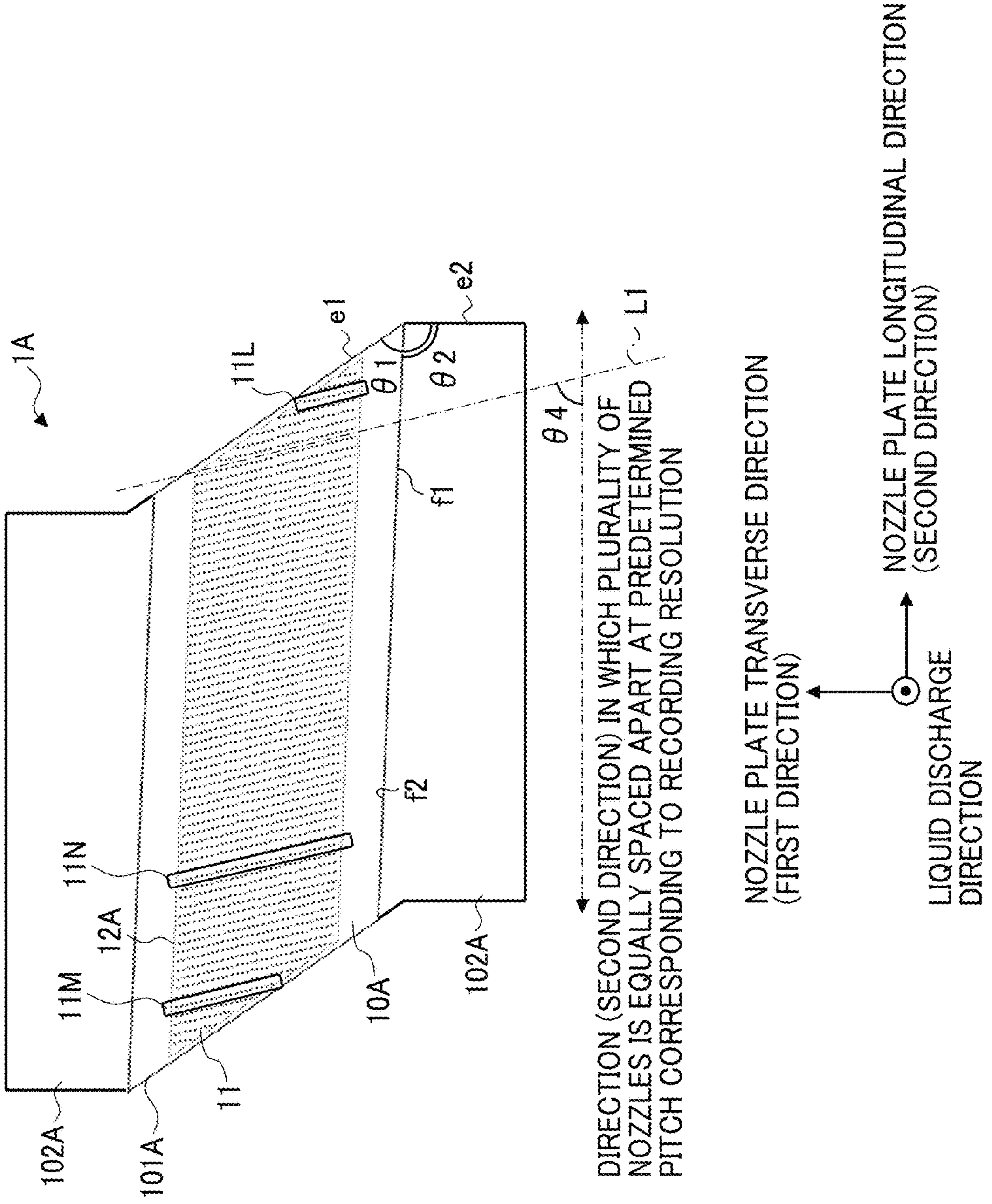
FIG. 7 is a diagram illustrating a head according to a first embodiment.
Figure 8A:
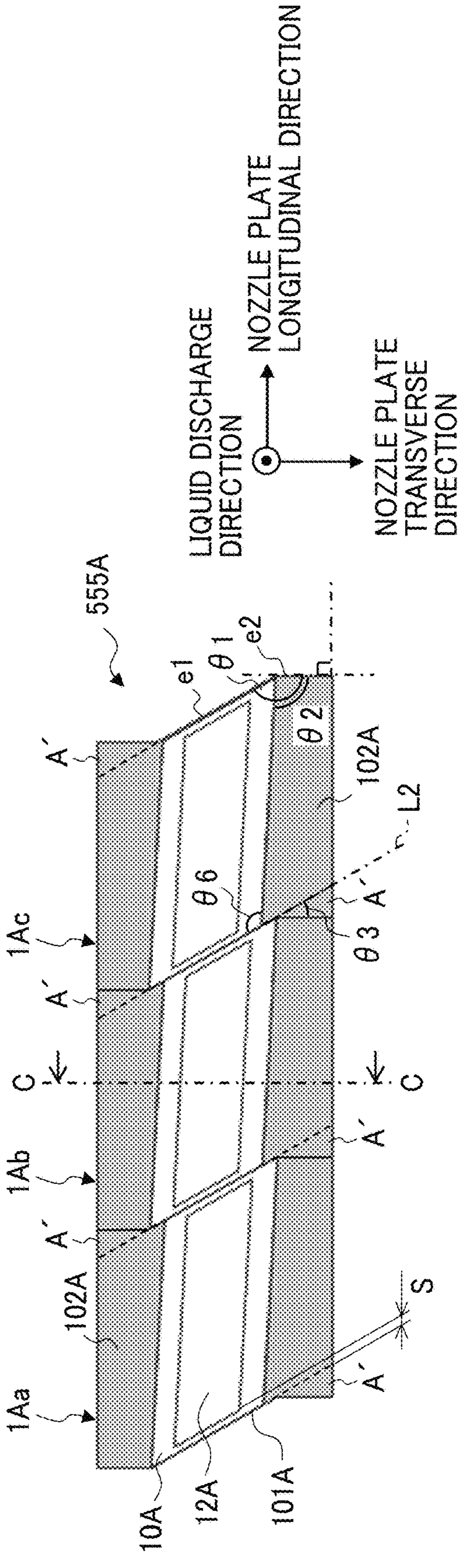
FIGS. 8A and 8B are diagrams each illustrating a head unit according to the first embodiment.
Figure 8B:
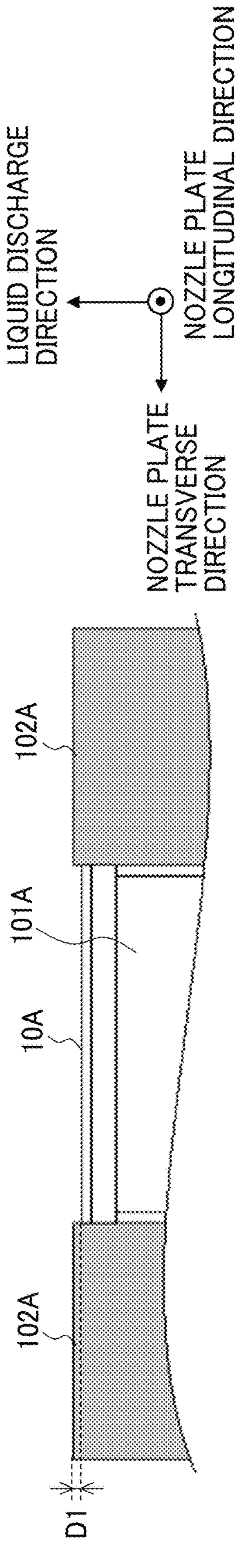

A first embodiment is hereinafter described with reference to FIGS. 7, 8A, and 8B. FIG. 7 is a diagram illustrating a head according to the first embodiment, and FIGS. 8A and 8B are diagrams each illustrating a head unit according to the first embodiment. FIG. 8A is a schematic view of the head unit, and FIG. 8B is an enlarged view of a cross section along the line C-C of FIG. 8A.

In FIG. 7, ahead 1A includes a liquid discharger 101A and a nozzle plate holder 102A. The mounting member 103 described with reference to FIG. 2 is omitted in FIG. 7. The liquid discharger 101A further includes a nozzle plate 10A. The nozzle plate 10A includes multiple nozzles 11 on a plane (a nozzle surface 12A) formed in a nozzle plate transverse direction that is a first direction and a nozzle plate longitudinal direction that is a second direction and orthogonal to the nozzle plate transverse direction.

Moreover, the nozzle plate holder 102A is positioned in a nozzle plate transverse direction of the nozzle plate 10A, and holds the nozzle plate 10A. The second direction is not only a nozzle plate longitudinal direction but also "a direction in which multiple nozzles is equally spaced apart at a predetermined pitch corresponding to a recording resolution" illustrated in FIG. 7. The nozzles 11 on the nozzle surface 12A form a nozzle array 11N (11M, 11L) including one or more nozzles 11. Each nozzle array 11N (11M, 11L) is arranged to be inclined with respect to the nozzle plate longitudinal direction (the second direction). That is, on the nozzle plate 10A, each nozzle array 11N (11M, 11L) is arranged parallel to a line L1 inclined at an angle θ4 with respect to the nozzle plate longitudinal direction. In other words, the line L indicates a direction of the nozzle arrays.

As for the arrangement of the nozzles 11 on the nozzle plate 10A, the nozzle array 11N having N nozzles 11 in a row is arranged in an area near a middle portion of the nozzle plate 10A in the nozzle plate longitudinal direction. On the other hand, the nozzle array 11M having M (where M<N) nozzles 11 in a row is arranged in one end portion (a left end portion in FIG. 7) of the nozzle plate 10A, and the nozzle array 11L having (N−M) nozzles 11 in a row is arranged in the other end portion (a right end portion in FIG. 7) of the nozzle plate 10A.

The number of nozzles 11 to be included in a single nozzle array becomes sequentially smaller as a nozzle array is nearer to one end portion (the left end portion in FIG. 7) from the middle portion of the nozzle plate 10A. In the other end portion (the right end portion in FIG. 7) of the nozzle plate 10A, the number of nozzles 11 to be included in a single nozzle array becomes sequentially smaller as a nozzle array is nearer to the other end portion from the middle portion of the nozzle plate 10A. Herein, one end portion (the left end portion in FIG. 7) of the nozzle plate 10A is one example of "a first end portion", and the other end portion (the right end portion in FIG. 7) of the nozzle plate 10A is one example of "a second end portion".

The nozzle plate 10A is formed in the shape of a parallelogram having a nozzle-plate short side e1 inclined with respect to the nozzle plate longitudinal direction and a nozzle-plate long side f1 intersecting with the nozzle-plate short side e1. The nozzle plate holder 102A which holds the nozzle plate 10A has a holder long side 2 formed along the nozzle-plate long side f1, and a holder short side e2 intersecting with the holder long side f2.

Shapes of the nozzle plate 10A and the nozzle plate holder 102A are configured such that a sum of an acute angle θ1 formed by the nozzle-plate short side e1 and the nozzle-plate long side f1 of the nozzle plate 10A and an interior angle θ2 formed by the holder long side f2 and the holder short side e2 of the nozzle plate holder 102A (i.e., a sum of θ1+θ2) is less than 180 degrees.

The head 1 having the above-described configuration can provide a head unit 555A by arrangement of multiple heads 1A (1Aa, 1Ab, and 1Ac) in a line in a nozzle plate longitudinal direction as illustrated in FIG. 8A. In such a case, the nozzle array 11M having M numbers of nozzles 11 illustrated in FIG. 7 is arranged to be vertically (the nozzle plate transverse direction) spaced apart from a nozzle array 11L having (N−M) nozzles 11 in an adjacent head. As a result, a nozzle array having N numbers of nozzles 11 in which the number of nozzles is equal to that in the nozzle array 11N is formed.

In the first embodiment, such a configuration can eliminate a protrusion of an area A illustrated in FIG. 6B, and shorten a length in the nozzle plate longitudinal direction of the heads 1A (1Aa, 1Ab, 1Ac) or the head unit 555A. Moreover, in the first embodiment, since an area A' illustrated in FIG. 6B remains as an area A' in an adjacent head as illustrated in FIG. 8A, a strength of the head unit 555A in the nozzle plate longitudinal direction can be substantially equal to a strength of the comparative example.

In addition, a space S is provided in a connecting portion of each of the heads 1Aa through 1Ac, so that the nozzle surface 12A can be arranged away from an edge (a nozzle-plate short side e1) of the nozzle plate 10A. As a result, for example, even in a case where impact from an external unit is exerted on a portion of the edge (the nozzle-plate short side e1) of the nozzle plate 10A, the impact does not tend to be transmitted to a nozzle or a pressure chamber and a channel connected to the nozzle, thereby reducing damage to the head.

In addition, multiple heads 1A can be connected such that nozzles 11 included in the multiple heads 1A are arranged at a predetermined pitch corresponding to a recording resolution (e.g., a recording resolution d) even if the nozzles 11 are not arranged very near to an end portion of the head 1A (the nozzle plate 10A), and the entire head is not largely offset in a vertical direction (the nozzle plate transverse direction) with respect to the other heads. Accordingly, the heads 1A can be arranged in a line in the nozzle plate longitudinal direction, and a line-shaped head unit having an optional length can be created.

Although the present embodiment has been described using a configuration in which the nozzle array 11N (11M, 11L) is arranged parallel to the line L1 inclined at an angle θ4 with respect to the nozzle plate longitudinal direction (the second direction), an inclination of the nozzle array is not limited thereto. For example, the nozzle array 11N (11M, 11L) may be orthogonal to the nozzle plate longitudinal direction (the second direction) and inclined with respect to the nozzle plate transverse direction (the first direction).

In the present embodiment as described above, the head 1A includes the nozzle plate 10A and the nozzle plate holder 102A which holds the nozzle plate 10A. The nozzle plate 10A includes multiple nozzles 11 formed on the nozzle surface 12A formed in a nozzle plate transverse direction and a nozzle plate longitudinal direction orthogonal to the nozzle plate transverse direction. The nozzle plate holder 102A is positioned in the nozzle plate transverse direction of the nozzle plate 10A. Where the nozzle plate longitudinal direction is defined as a direction in which multiple nozzles 11 is equally spaced apart at a predetermined pitch corresponding to a recording resolution d, multiple nozzle arrays 11N (11M, 11L) each including multiple nozzles 11 is formed on the nozzle plate 10A in a state in which the multiple nozzle arrays is inclined at an angle θ4 with respect to the nozzle plate longitudinal direction. Moreover, the nozzle plate 10A includes the nozzle-plate short side e1 inclined with respect to the nozzle plate longitudinal direction, and the nozzle-plate long side f1 intersecting with the nozzle-plate short side e1. Where an acute angle formed by the nozzle-plate short side e1 and the nozzle-plate long side f1 is an angle θ1, and an internal angle that is adjacent to the angle θ1 and formed by the holder long side f2 of the nozzle plate holder 102A and the holder short side e2 intersecting with the holder long side f2 is an angle θ2, a sum of the angle θ1 and the angle θ2 (i.e., a sum of θ1+θ2) is set to be less than 180 degrees. The holder long side f2 is formed along the nozzle-plate long side f1.

In addition, as described above, the nozzle arrays 11N (11M. 11L) are formed on the nozzle plate 10A in a state in which the nozzle arrays 11N (11M, 11L) are inclined with respect to the nozzle plate transverse direction (a first direction).

In addition, as described above, the nozzle array 11N having N nozzles is arranged in an area near a middle portion of the nozzle plate 10A in the nozzle plate longitudinal direction (a second direction). The nozzle array 11M having M nozzles, which are less than the N nozzles, is arranged in a first end portion of the nozzle plate 10A instead of the area near the middle portion of the nozzle plate 10A in the nozzle plate longitudinal direction. The nozzle array 11L having (N−M) nozzles 11 is arranged in a second end portion of the nozzle plate 10A instead of the area near the middle portion of the nozzle plate 10A in the nozzle plate longitudinal direction.

Therefore, the heads 1A (1Aa, 1Ab, and 1Ac) or the head unit 555A can be made compact.

Moreover, as illustrated in FIG. 8B, the nozzle plate 10A is held by the nozzle plate holder 102A such that a surface of the nozzle plate 10A is positioned on an inner side relative to a surface of the nozzle plate holder 102A in a liquid discharge direction. That is, a surface of the nozzle plate 10A is recessed toward a side opposite the liquid discharge direction by a thickness D1 relative to a surface of the nozzle plate holder 102A. Thus, the head 1A and the end portion of the nozzle plate 10A can be protected from an external unit.

Second Embodiment

Figure 9:
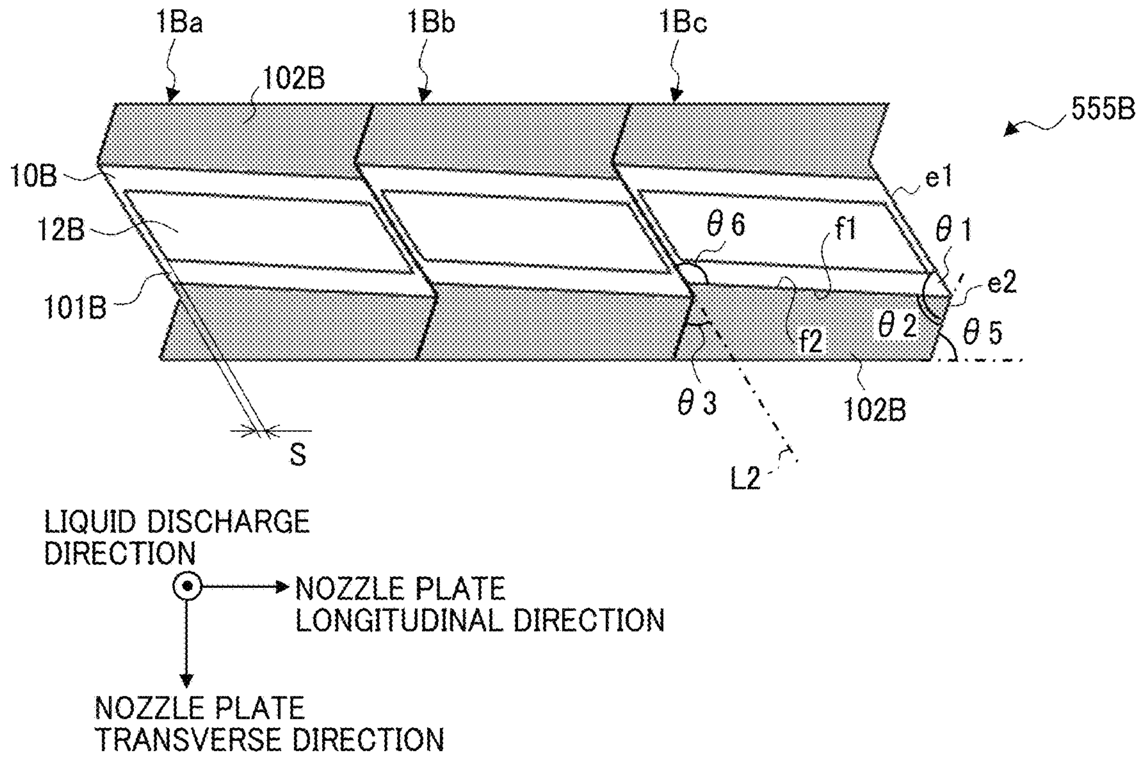
FIG. 9 is a diagram illustrating a head unit according to a second embodiment.

FIG. 9 is a diagram illustrating a head unit according to a second embodiment. As illustrated in FIG. 9, a head unit 555B includes multiple heads 1Ba, 1Bb, and 1Bc (also collectively called heads 1B). Each of the heads 1B includes a liquid discharger 101B and a nozzle plate holder 102B, and the liquid discharger 101B includes a nozzle plate 10B having a nozzle surface 12B.

In the first embodiment, a line in the nozzle plate longitudinal direction of the nozzle plate holder 102A and the holder short side e2 of the nozzle plate holder 102A form a right angle. The second embodiment differs from the first embodiment in that an interior angle θ2 formed by a holder long side f2 and a holder short side e2 of a nozzle plate holder 102B is less than 90 degrees, and the holder short side e2 of the nozzle plate holder 102B is inclined at an angle θ5 with respect to a line in a nozzle plate longitudinal direction.

In the second embodiment, when the heads 1Ba, 1Bb, and 1Bc are adjacently arranged in a nozzle plate longitudinal direction, a shape of each of the heads 1Ba through 1Bc in a nozzle plate transverse direction is configured such that connecting portions (borders) of the respective heads 1Ba through 1Bc match each other.

Particularly, in the connecting portion of each of the heads 1Ba through 1Bc, an obtuse angle formed by the nozzle-plate short side e1 and the nozzle-plate long side f1 is set to an angle θ6, and a virtual extension line L2 that is an extension of the nozzle-plate short side e1 forming the angle θ6 is drawn. Then, an angle formed by the virtual extension line L2 and the holder short side e2 intersecting with the virtual extension line L2 is defined as an angle θ3. In this case, a shape of the head in the nozzle plate transverse direction is configured such that a sum of an angle θ1 (an acute angle formed by the nozzle-plate short side e1 and the nozzle-plate long side f1), the angle θ2 (the interior angle formed by the holder short side e2 and the holder long side f2), and the angle θ3 is 180 degrees.

Even in the second embodiment, such a configuration can eliminate a protrusion of the area A illustrated in FIG. 6B, and shorten a length in the nozzle plate longitudinal direction of the heads 1B (1Ba, 1Bb, 1Bc) or a head unit 555B.

Such relations of the angles θ1, θ2, and θ3 enable the heads to be adjacently arranged in a close-fitting manner, so that a strength (toughness) of the head unit 555B in the nozzle plate longitudinal direction can be obtained. In addition, since the heads are adjacently arranged in a close-fitting manner, a failure in which a medium such as a sheet or a cleaning member such as a wiper that cleans a nozzle surface 12B is caught in a connecting portion of the head 1B can be prevented when the heads are installed in the printing apparatus 500.

According to the second embodiment, moreover, although a position of a protrusion differs from a position of the area A in the comparative example illustrated in FIG. 6B, the nozzle plate holder 102B can have a size (an area) that is substantially the same size as the nozzle plate holder 102Z of the comparative example illustrated in FIG. 6B. Thus, for example, even if an electrical component such as a control circuit board and wiring is disposed inside or on the back surface of the nozzle plate holder 102B, the head can be configured without significant changes from related-art component arrangement.

Furthermore, in the second embodiment, since the spaces S are arranged in the connecting portions of the respective heads 1Ba through 1Bc, effects similar to the first embodiment can also be obtained. As a result, for example, even in a case where impact from an external unit is exerted on a portion of an edge (the nozzle-plate short side e1) of the nozzle plate 10B, the impact does not tend to be transmitted to a nozzle or a pressure chamber and a channel connected to the nozzle, thereby reducing damage to the head module.

According to the present embodiment as described above, where an obtuse angle formed by the nozzle-plate short side e1 and the nozzle-plate long side f1 is the angle θ6, and an angle formed by the virtual extension line L2 forming the angle θ6 and the holder short side e2 intersecting with the virtual extension line L2 is the angle θ3, a sum of the angles θ1, θ2, and θ3 is 180 degrees.

Accordingly, the heads can be adjacently arranged in a close-fitting manner, so that a strength (toughness) of the head unit in the nozzle plate longitudinal direction can be obtained.

Third Embodiment

Figure 10:
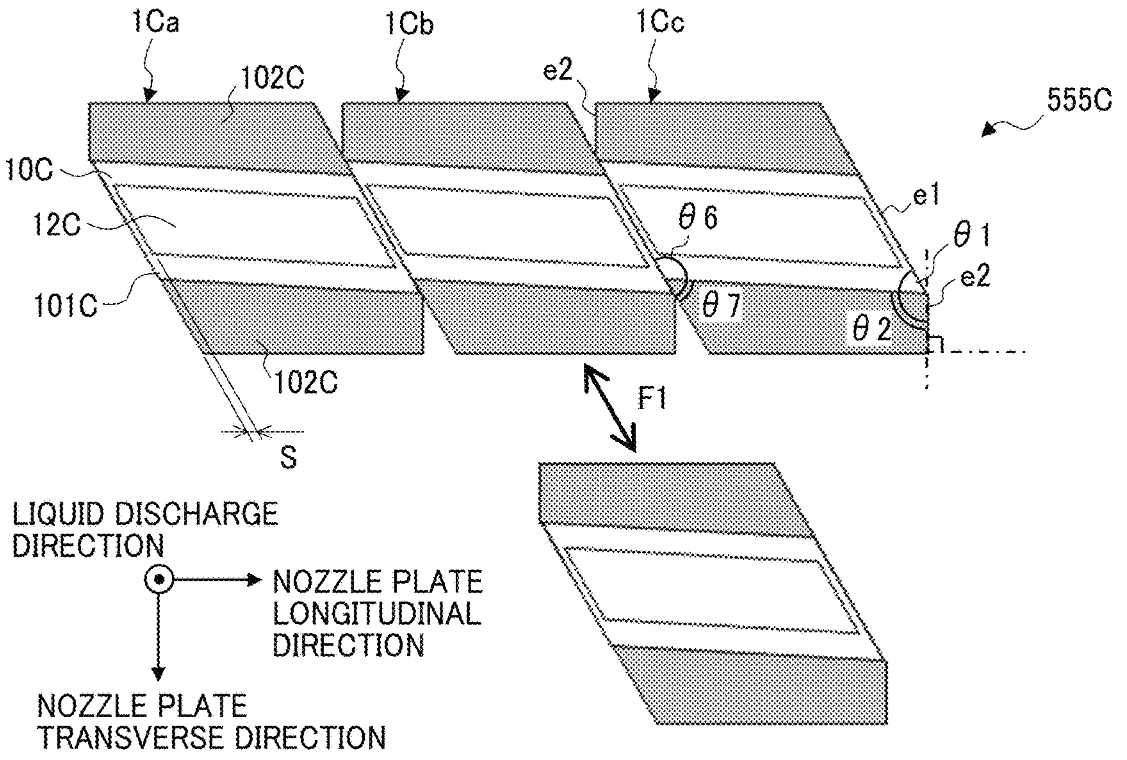
FIG. 10 is a diagram illustrating a head unit according to a third embodiment.

FIG. 10 is a diagram illustrating a head unit according to a third embodiment. As illustrated in FIG. 10, a head unit 555C includes multiple heads 1Ca, 1Cb, and 1Cc (also collectively called heads 1C). Each of the heads 1C includes a liquid discharger 101C and a nozzle plate holder 102C, and the liquid discharger 101C includes a nozzle plate 10C having a nozzle surface 12C.

Each of the heads 1C (1Ca, 1Cb, and 1Cc) illustrated in FIG. 10 according to the third embodiment does not have an area corresponding to an area A in the head unit 555A illustrated in FIG. 8A.

That is, a holder short side e2 is formed along a virtual extension line L2 that is extension of a nozzle-plate short side e1 from a side at which an angle formed by the nozzle-plate short side e1 and a nozzle-plate long side f1 is an obtuse angle. In other words, where an obtuse angle formed by the nozzle-plate short side e1 and the nozzle-plate long side f1 is an angle θ6, and an angle that is adjacent to the angle θ6 and formed by the holder short side e2 and a holder long side f2 is an angle θ7, a sum of the angles θ6 and θ7 is 180 degrees. A relation between angles θ1 and θ2 in the third embodiment is similar to that in each of the first and second embodiments.

In the third embodiment, not only a length in a nozzle plate longitudinal direction of the heads 1C or a head unit 555C can be shortened, but also the head 1C can be detached from a direction (indicated by an arrow F1) parallel to the nozzle-plate short side e1. Thus, access to the head unit 555 or the head 1C during assembly of the head unit 555C or replacement of the head 1C can be enhanced.

Fourth Embodiment

Figure 11:
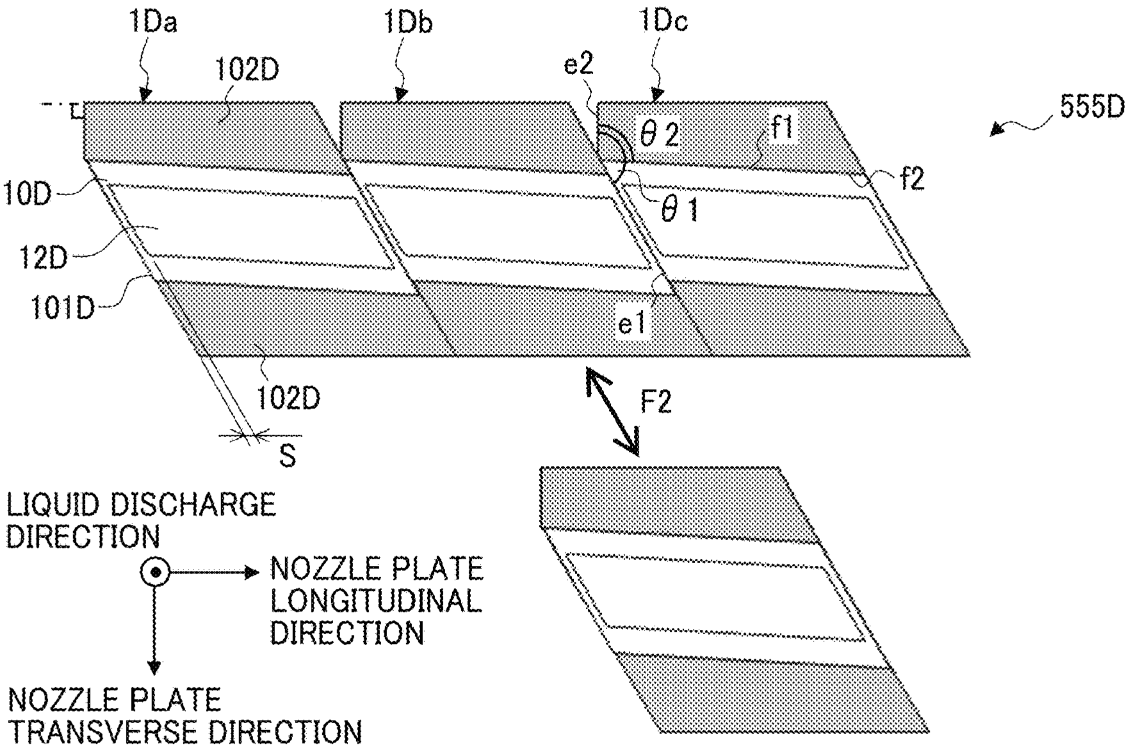
FIG. 11 is a diagram illustrating a head unit according to a fourth embodiment.

FIG. 11 is a diagram illustrating a head unit according to a fourth embodiment. As illustrated in FIG. 11, a head unit 555D includes multiple heads 1Da, 1Db, and 1Dc (also collectively called heads 1D). Each of the heads 1D includes a liquid discharger 101D and a nozzle plate holder 102D, and the liquid discharger 101D includes a nozzle plate 10D having a nozzle surface 12D.

In the first embodiment, as illustrated in FIG. 8A, there are two locations each having a right angle formed by a line in the nozzle plate longitudinal direction of the nozzle plate holder 102A and the holder short side e2 of the nozzle plate holder 102A. That is, in the first embodiment, in the nozzle plate 10A having a parallelogram shape, the locations having the right-angles are arranged to be adjacent to two acute angles diagonally provided in the parallelogram.

In the fourth embodiment, on the other hand, there is one location (an upper left portion of each head 1D illustrated in FIG. 11) having a right angle formed by a line in a nozzle plate longitudinal direction of a nozzle plate holder 102D and a holder short side e2 of the nozzle plate holder 102D. That is, in the present embodiment, there is one location in which a sum of an acute angle θ1 formed by a nozzle-plate short side e1 and a nozzle-plate long side f1 of a nozzle plate 10D and an interior angle θ2 formed by a holder long side f2 and the holder short side e2 of the nozzle plate holder 102D (i.e., a sum of θ1 and θ2) is less than 180 degrees.

In the fourth embodiment, since an area similar to the area A illustrated in FIG. 6B is present in a lower right portion of each of the heads 1D as illustrated in FIG. 11, a length in a nozzle plate longitudinal direction of the head 1D is longer than that in a nozzle plate longitudinal direction of the head in each of the above-described first through third embodiments. However, the head 1D does not have an area similar to the area A in an upper left portion, and thus a size of the head 1D is smaller than that of the comparative example.

In the fourth embodiment, the head 1D can be detached from a direction (indicated by an arrow F2) parallel to the nozzle-plate short side e1 of the nozzle plate 10D. Thus, access to a head unit 555D or the head 1D during assembly of the head unit 555C or replacement of the head 1D can be enhanced.

The third embodiment has been described using a case in which a right angle is formed by a line in a nozzle plate longitudinal direction of the nozzle plate holder 102C and the holder short side e2 of the nozzle plate holder 102C. Moreover, the fourth embodiment has been described using a case in which a right angle is formed by a line in a nozzle plate longitudinal direction of the nozzle plate holder 102D and the holder short side e2 of the nozzle plate holder 102D. However, each of the third and fourth embodiments is not limited to a case in which such a right angle is formed. For example, the holder short side e2 may be inclined at an angle smaller than 90 degrees to obtain a shape as described in the second embodiment.

Fifth Embodiment

Figure 12:
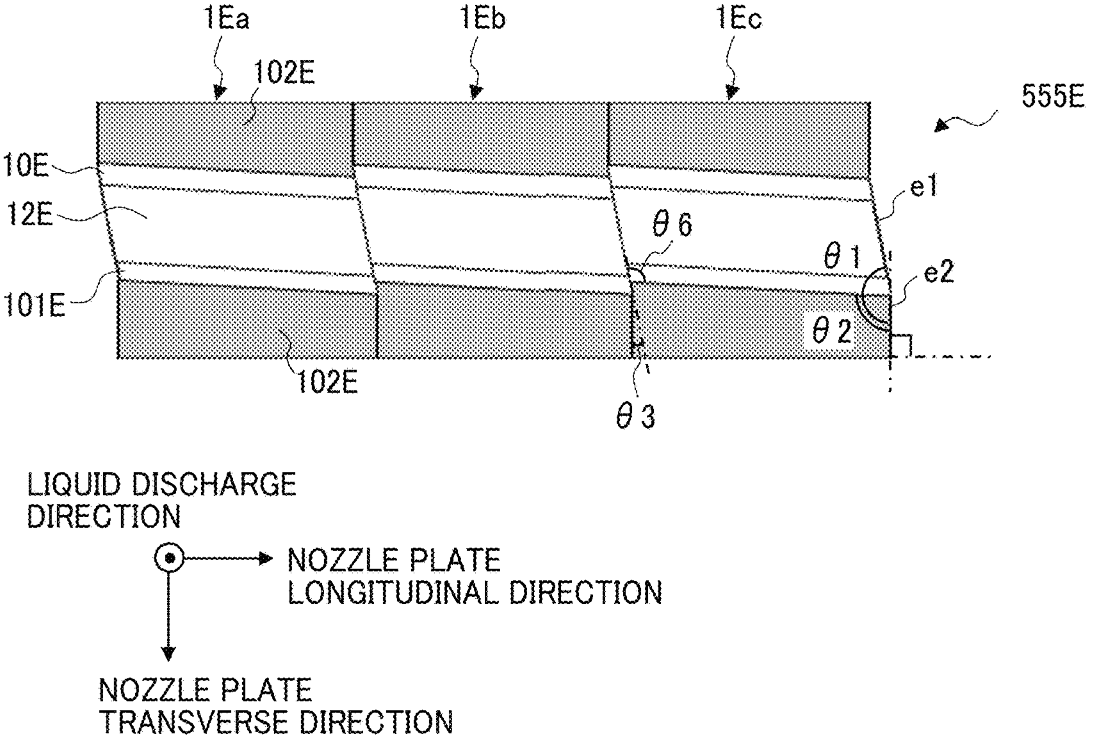
FIG. 12 is a diagram illustrating a head unit according to a fifth embodiment.

FIG. 12 is a diagram illustrating a head unit according to a fifth embodiment. As illustrated in FIG. 12, ahead unit 555E includes multiple heads 1Ea, 1Eb, and 1Ec (also collectively called heads 1E). Each of the heads 1E includes a liquid discharger 101E and a nozzle plate holder 102E, and the liquid discharger 101E includes a nozzle plate 10E having a nozzle surface 12E.

Each of the heads 1E (1Ea, 1Eb, and 1Ec) illustrated in FIG. 12 according to the fifth embodiment does not have an area corresponding to the area A in the head unit 555Y illustrated in FIG. 6A (the comparative example).

In the fifth embodiment, nozzle plates directly contact each other between adjacent heads if multiple heads is arranged to form a head unit. Consequently, toughness of the nozzle plate of the head with respect to physical impact is inferior. However, since a length in a nozzle plate longitudinal direction of the head 1E or a head unit 555E can be shortened, effects similar to those in the first through fourth embodiments can be obtained. A relation between an angle θ1 and an angle θ2 in the fifth embodiment is similar to the that in each of the first through third embodiments.

APPLICATION EXAMPLE

Application Example 1

The liquid discharge head according to each of the above-described embodiments can discharge liquid that is used for formation of a three-dimensional object. The liquid to be used for formation of a three-dimensional object is, for example, a hydrogel formation material for formation of a three-dimensional structure to be used in treatment manipulation training. The hydrogel formation material contains water and a polymerizable monomer, and preferably contains a mineral and an organic solvent. In addition, the hydrogel formation material can contain a polymerization initiator and other components as necessary. The polymerizable monomer is a compound having one or more unsaturated carbon-carbon bonds, and is preferably polymerized by activation energy rays such as ultraviolet rays and electron beams.

Examples of the polymerizable monomers include a monofunctional monomer and a multifunctional monomer. These may be used alone or in combination. Examples of the multifunctional monomers include a bifunctional monomer, a trifunctional monomer, and a tetra or higher functional monomer.

The mineral is not limited to any particular mineral. Although a mineral can be appropriately selected for each purpose, a clay mineral is preferred since a main component of the hydrogel is water. Furthermore, a layered clay mineral that is uniformly dispersible in water at a primary crystal level is preferred, and a water-swellable layered clay mineral is more preferred.

An example of the organic solvent includes a water-soluble organic solvent. Water solubility of the water-soluble organic solvent means that an organic solvent is soluble at 30% by mass or greater relative to water. The water-soluble organic solvent is not particularly limited, and can be appropriately selected for each purpose. Examples of water-soluble organic solvents include: alkyl alcohols having one or more and four or less carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethyl acetamide; ketone or ketone alcohols such as acetone, methyl ethyl ketone, and diacetone alcohol; ethers such as tetrahydrofuran and dioxane; polyhydric alcohol such as ethylene glycol, propylene glycol, 1, 2-propanediol, 1, 2-butanediol, 1, 3-butanediol, 1, 4-butanediol, diethylene glycol, triethylene glycol, 1,2,6-hexanetriol, thioglycol, hexylene glycol, and glycerin; polyalkylene glycols such as polyethylene glycol and polypropylene glycol; lower alcohol ethers of polyhydric alcohol such as ethylene glycol monomethyl (or ethyl) ether, diethylene glycol methyl (or ethyl) ether, and triethylene glycol monomethyl (or ethyl) ether; alkanolamines such as monoethanolamine, diethanolamine, and triethanolamine; and other such as N-Methyl-2-pyrrolidone, 2-pyrrolidone, and 1,3-dimethyl-2-imidazolidinone.

These may be used alone or in combination. Among such organic solvents, polyhydric alcohol, glycerin, and propylene glycol are preferred from a viewpoint of moisture-retaining property, and glycerin and propylene glycol are more preferred.

The polymerization initiator is not particularly limited, and can be appropriately selected for each purpose. Examples of polymerization initiators include a photopolymerization initiator and a thermal polymerization initiator. As for the photopolymerization initiator, an optional material that generates a radical by light that is emitted (particularly, an ultraviolet (UV) ray having a wavelength of 220 nm to 400 nm) can be used. In a case where a hydrogel formation material is used to form a three-dimensional object, a UV emitting device is disposed to irradiate a discharged hydrogel formation material with UV rays, so that the hydrogel formation material is hardened, and a three-dimensional object is formed.

(Particular Example of Hydrogel Formation Material)

While agitating 120.0 parts by mass of ion exchanged water that had undergone pressure reduction and deaeration for 30 minutes, 12.0 parts by mass of synthetic hectorite (Laponite-XLG manufactured by Rockwood Inc.) having a composition of [Mg5.34Li0.66Si8O20(OH4]Na-0.66 as a layered clay mineral was added little by little and agitated. In addition, 0.6 parts by mass of etidronic acid (manufactured by Tokyo Chemical Industry Co., Ltd.) was added and agitated, so that dispersion liquid was produced. Subsequently, 44.0 parts by mass of acryloylmorpholine (manufactured by KJ Chemicals Corporation) from which polymerization inhibitor had been removed by passing through an activated alumina column, and 0.4 parts by mass of methylenebisacrylamide (manufactured by Tokyo Chemical Industry Co., Ltd.) were added as polymerizable monomer to the dispersion liquid. Furthermore, 20.0 mass of glycerin (manufactured by Sakamoto Yakuhin Kogyo Co., Ltd.) and 0.8 parts by mass of N,N,N',N'-Tetramethylethylenediamine (manufactured by Tokyo Chemical Industry Co., Ltd.) were mixed, so that a hydrogel formation material was obtained.

Application Example 2

The liquid discharge head according to each of the above-described embodiments can be used for an inkjet method for optional arrangement of cells to artificially forming an organism containing cells, and can discharge a cell suspension (cell ink). The cell suspension (cell ink) at least contains cells and a cell drying inhibitor. Moreover, the cell suspension (cell ink) contains a dispersant that causes cells to be dispersed, and can contain other additive materials such as a dispersing agent and a pH adjuster as necessary.

A type of the cell is not particularly limited, and can be appropriately selected for each purpose. Every cell can be used regardless of whether, for example, a cell is taxonomically a eukaryotic cell, a procaryotic cell, a multicellular organism cell, or a unicellular organism cell. These may be used alone or in combination.

Examples of the eukaryotic cells include an animal cell, an insect cell, a plant cell, and a fungus. These may be used alone or in combination. In these examples, the animal cell is preferred. In a case where cells form a cell aggregate, an adherent cell having cell adhesiveness by which cells adhere to each other and are not isolated unless a physicochemical process is performed is more preferred.

The cell drying inhibitor has a function of covering a surface of a cell to inhibit dryness of the cell. Examples of the cell drying inhibitors include polyhydric alcohols, gel polysaccharides, and a protein selected from an extracellular matrix.

The dispersant is preferably a buffer solution or a culture medium for cell culture. The culture medium contains components necessary for formation and maintenance of a cell organism, and is a solution that prevents dryness and arranges an external environment such as an osmotic pressure. A solution or medium known as a culture medium can be appropriately selected and used. In a case where cells do not need to be constantly immersed in a culture medium, the culture medium can be appropriately removed from a cell suspension. The buffer solution adjusts pH depending on a cell or a purpose, and a known buffer solution may be appropriately selected and used.

(Particular Example of Cell Suspension (Cell Ink))

A green fluorescent dye (Cell Tracker Green manufactured by Life Technologies Ltd.) was dissolved in dimethyl sulphoxide (DMSO) at a concentration of 10 mmol/L(mM), and the resultant solution was mixed with serum-free Dulbecco's modified Eagle medium (manufactured by Life Technologies Ltd.). Thus, a green fluorescent dye-containing serum-free medium having a concentration of 10 μmol/L(μM) was prepared. Subsequently, 5 mL of the green fluorescent dye-containing serum-free medium was added into a dish having a cultured NIH/3T3 cells (Clone 5611, JCRB Cell Bank), and the resultant cells were cultured for 30 minutes in an incubator (KM-CC17RU2 manufactured by Panasonic Corporation, 37° C., 5% by volume CO2 environment). Then, a supernatant was removed using an aspirator. Five milliliters of phosphate buffered saline (hereinafter also referred to as PBS (−), manufactured by Life Technologies Ltd.) was added to the dish, and the PBS (−) was removed by suction using an aspirator to clean the surface. After cleaning with the PBS (−) was repeated twice, 2 ml of trypsin-ethylene diamine tetra acetic acid (EDTA) solution (manufactured by Life Technologies Ltd.) was added per dish. The trypsin-EDTA solution added herein was 0.05% by mass of trypsin with 0.05% by mass of EDTA.

Next, the resultant solution containing the cells was heated for 5 minutes in the incubator, and the cells were exfoliated from the dish. Subsequently, 4 mL of D-MEM containing 10% by mass of a fetal bovine serum (hereafter also referred to as FBS) and 1% by mass of an antibiotic (Antibiotic-Antimycotic Mixed Stock Solution (100×), manufactured by NACALAI TESQUE, INC.) was added. Next, a cell suspension in which trypsin had been devitalized was transferred to a single 50-mL centrifuge tube. The cell suspension in the centrifuge tube was centrifuged (at 1,200 rpm for 5 minutes at 5° C. by a machine named H-19FM manufactured by KOKUSAN Co., Ltd.), and a supernatant was removed using an aspirator.

After the removal, 2 mL of D-MEM containing 10% by mass of FBS and 1% by mass of antibiotic was added to the centrifuge tube, and pipetting was gently performed to disperse the cells. Hence, a cell suspension was acquired. After 10 μL of the cell suspension was extracted into an Eppendorf tube and 70 μL of a culture medium was added into the tube, 10 μL of the resultant cell suspension was extracted into another Eppendorf tube. Then, 10 μL of a trypan blue stain solution in an amount of 0.4% by mass was added, and pipetting was performed. From the stained cell suspension, 10 μL of the suspension was removed and placed on a plastic slide made of polymethyl methacrylate (PMMA).

The number of cells was counted using a counter named Countess Automated Cell Counter (manufactured by Invitrogen), so that a cell suspension containing cells the cell number of which had been counted was obtained. Moreover, a PBS (−) was used as a dispersant. Glycerin (a molecular biology grade, manufactured by Wako Pure Chemical Industries, Ltd.) as a cell drying inhibitor was dissolved in the PBS (−) so as to have a mass ratio of 0.5% by mass, and an NIH/3T3 cell suspension was dispersed in a dispersant so as to be 6×106 cell/mL Accordingly, a cell ink was obtained.

[Aspect 1]

A liquid discharge head includes: a nozzle plate having multiple nozzles on a plane of the nozzle plate in a first direction and a second direction orthogonal to the first direction; and a nozzle plate holder adjacent to the nozzle plate in the first direction and configured to hold the nozzle plate, wherein the multiple nozzles in the nozzle plate are arrayed in a third direction inclined with the first direction to form a nozzle array, multiple nozzle arrays, including the nozzle array, arrayed in the nozzle plate in a fourth direction inclined with respect to the second direction, and the nozzle plate has: a nozzle-plate short side inclined with respect to the second direction; and a nozzle-plate long side intersecting the nozzle-plate short side and along the fourth direction, and the nozzle-plate short side forms an acute angle θ1 with the nozzle-plate long side, and the nozzle plate holder has: a holder long side along the nozzle-plate long side; and a holder short side intersecting the holder long side with an internal angle θ2 adjacent to the acute angle θ1, and a sum of the angle θ1 and the angle θ2 is less than 180 degrees.

[Aspect 2]

In the liquid discharge head according to aspect 1, the nozzle-plate short side is inclined with the third direction of the nozzle array, and the nozzle-plate long side is along the fourth direction of the multiple nozzle arrays.

[Aspect 3]

In the liquid discharge head according to aspect 1, multiple nozzle array has: a first nozzle array having N numbers of nozzles in a middle portion of the nozzle plate in the fourth direction; a second nozzle array having M numbers of nozzles less than the N numbers of nozzles and in a first end portion of the nozzle plate on one side of the middle portion in the fourth direction; and a third nozzle array having (N−M) numbers of nozzles in a second end portion of the nozzle plate on another side of the middle portion opposite to the first end portion via the middle portion in the fourth direction.

[Aspect 4]

In the liquid discharge head according to aspect 1, a liquid is discharge from the nozzle in a liquid discharge direction, and the nozzle plate has a surface interior of a surface of the nozzle plate holder in the liquid discharge direction.

[Aspect 5]

In the liquid discharge head according to aspect 1, the nozzle plate has a parallelogram shape, and the acute angle θ1 is at least one of two acute angles diagonal in the parallelogram.

[Aspect 6]

In the liquid discharge head according to aspect 1, the nozzle-plate short side and the nozzle-plate long side form an obtuse angle θ6, a virtual extension line of the nozzle-plate short side that forms the obtuse angle θ6 and the holder short side intersecting the virtual extension line form an angle θ3, and a sum of the angle θ1, the angle θ2, and the angle θ3 is 180 degrees.

[Aspect 7]

In the liquid discharge head according to aspect 1, the nozzle-plate short side and the nozzle-plate long side form an obtuse angle θ6, the holder short side and the holder long side form an angle θ7 adjacent to the obtuse angle θ6, and a sum of the angle θ6 and the angle θ7 is 180 degrees.

[Aspect 8]

A liquid discharge device includes multiple liquid discharge heads including the liquid discharge head according to aspect 1, wherein the multiple liquid discharge heads are adjacent in the second direction.

[Aspect 9]

A liquid discharge apparatus includes: the liquid discharge head according to aspect 1, or the liquid discharge device according to aspect 8.

According to each of the above-described embodiments, a liquid discharge head that can be made compact can be provided.

In each of the above-described embodiments, a constituent feature can be appropriately changed, added, and deleted within the scope of the present disclosure. Note that the present disclosure is not limited to the details of the embodiments described above, but various modification and enhancement are possible by those skilled in the art within a technical concept of the present disclosure.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The invention claimed is:

1. A liquid discharge head comprising:

a nozzle plate having multiple nozzles on a plane of the nozzle plate in a first direction and a second direction orthogonal to the first direction; and a nozzle plate holder adjacent to the nozzle plate in the first direction and configured to hold the nozzle plate, wherein the multiple nozzles in the nozzle plate are arrayed in a third direction inclined with the first direction to form a nozzle array, multiple nozzle arrays, including the nozzle array, arrayed in the nozzle plate in a fourth direction inclined with respect to the second direction, and the nozzle plate has:

a nozzle-plate short side inclined with respect to the second direction; and a nozzle-plate long side intersecting the nozzle-plate short side and along the fourth direction, and the nozzle-plate short side forms an acute angle θ1 with the nozzle-plate long side, and the nozzle plate holder has:

a holder long side along the nozzle-plate long side; and a holder short side intersecting the holder long side with an internal angle θ2 consecutively adjacent to the acute angle θ1, and a sum of the acute angle θ1 and the internal angle θ2 is less than 180 degrees.

2. The liquid discharge head according to claim 1, wherein the nozzle-plate short side is inclined with the third direction of the nozzle array, and the nozzle-plate long side is along the fourth direction of the multiple nozzle arrays.

3. The liquid discharge head according to claim 1, wherein multiple nozzle array has:

a first nozzle array having N numbers of nozzles in a middle portion of the nozzle plate in the fourth direction;

a second nozzle array having M numbers of nozzles less than the N numbers of nozzles and in a first end portion of the nozzle plate on one side of the middle portion in the fourth direction; and a third nozzle array having (N−M) numbers of nozzles in a second end portion of the nozzle plate on another side of the middle portion opposite to the first end portion via the middle portion in the fourth direction.

4. The liquid discharge head according to claim 1, wherein a liquid is discharge from the multiple nozzles in a liquid discharge direction, and the nozzle plate has a surface interior of a surface of the nozzle plate holder in the liquid discharge direction.

5. The liquid discharge head according to claim 1, wherein the nozzle plate has a parallelogram shape, and the acute angle θ1 is at least one of two acute angles diagonal in a parallelogram.

6. The liquid discharge head according to claim 1, wherein the nozzle-plate short side and the nozzle-plate long side form an obtuse angle θ6, a virtual extension line of the nozzle-plate short side that forms the obtuse angle θ6 and the holder short side intersecting the virtual extension line form an angle θ3, and a sum of the acute angle θ1, the internal angle θ2, and the angle θ3 is 180 degrees.

7. The liquid discharge head according to claim 1, wherein the nozzle-plate short side and the nozzle-plate long side form an obtuse angle θ6, the holder short side and the holder long side form an angle θ7 adjacent to the obtuse angle θ6, and a sum of the obtuse angle θ6 and the angle θ7 is 180 degrees.

8. A liquid discharge device comprising:

multiple liquid discharge heads including the liquid discharge head according to claim 1, wherein the multiple liquid discharge heads are adjacent in the second direction.

9. A liquid discharge apparatus comprising:

the liquid discharge device according to claim 8.

10. A liquid discharge apparatus comprising:

the liquid discharge head according to claim 1.

* * * * *